United States Patent [19]
Boyce et al.

[11] Patent Number: 5,800,672
[45] Date of Patent: Sep. 1, 1998

[54] ULTRASONIC FASTENING SYSTEM AND METHOD

[75] Inventors: Joseph S. Boyce, Norwell; Glenn A. Freitas, Foxboro; Constance L. Magee, Wilmington; Thomas M. Fusco, Medford; John J. Harris, Northboro; Edward Kunkel, Newton, all of Mass.

[73] Assignee: Aztex, Inc., Waltham, Mass.

[21] Appl. No.: 780,171

[22] Filed: Dec. 26, 1996

Related U.S. Application Data

[63] Continuation-in-part of Ser. No. 600,473, Feb. 13, 1996, Pat. No. 5,589,015, which is a continuation of Ser. No. 254,987, Jun. 7, 1994, abandoned.

[51] Int. Cl.[6] .................................................. B32B 7/08
[52] U.S. Cl. ........................ 156/580.1; 156/73.1; 156/92; 156/303.1; 425/174.2
[58] Field of Search ...................... 156/73.1, 92, 303.1, 156/580.1, 580.2; 264/442, 443, 445, 277; 425/174.2; 228/1.1, 110.1

[56] References Cited

U.S. PATENT DOCUMENTS

| | | | |
|---|---|---|---|
| 3,184,353 | 5/1965 | Balamuth et al. | 156/92 X |
| 3,440,117 | 4/1969 | Soloff et al. | 156/92 X |
| 4,247,345 | 1/1981 | Kadija et al. | 156/73.4 |
| 4,490,199 | 12/1984 | Dunning | 156/73.4 |
| 4,808,461 | 2/1989 | Boyce et al. | 428/119 |
| 5,186,776 | 2/1993 | Boyce et al. | 156/73.2 |
| 5,589,015 | 12/1996 | Fusco et al. | 156/73.1 |

*Primary Examiner*—James Sells
*Attorney, Agent, or Firm*—Iandiorio & Teska

[57] ABSTRACT

An ultrasonic fastening system wherein an ultrasonic transducer is used to insert a plurality of fasteners supported by a compressible member into two components to be joined or a single composite part to be reinforced.

29 Claims, 5 Drawing Sheets

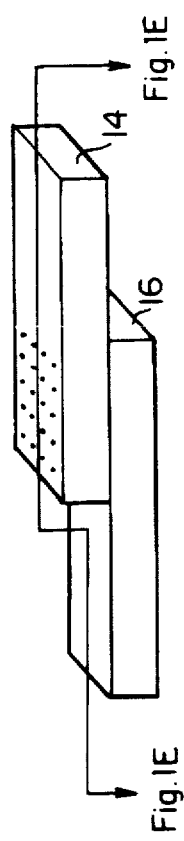
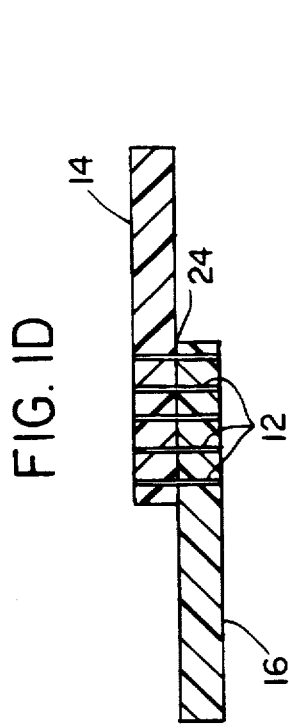
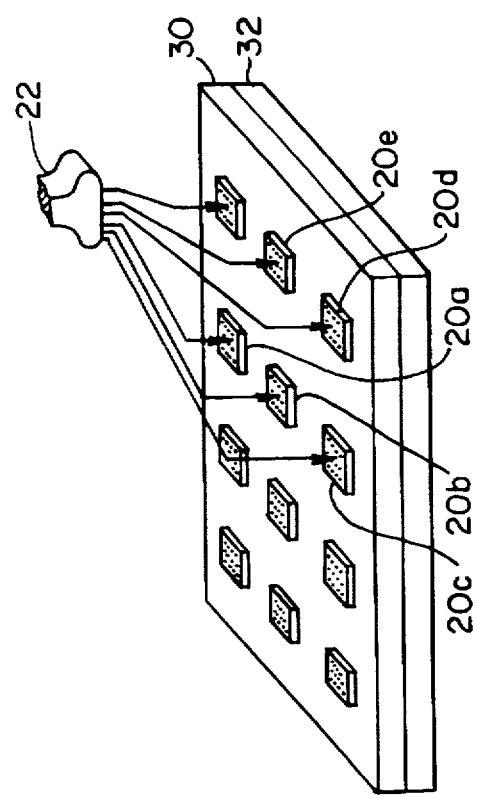
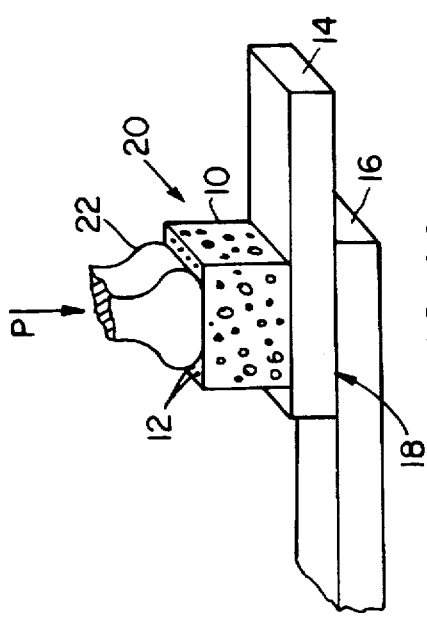
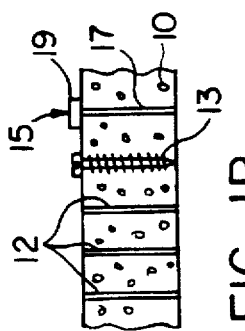
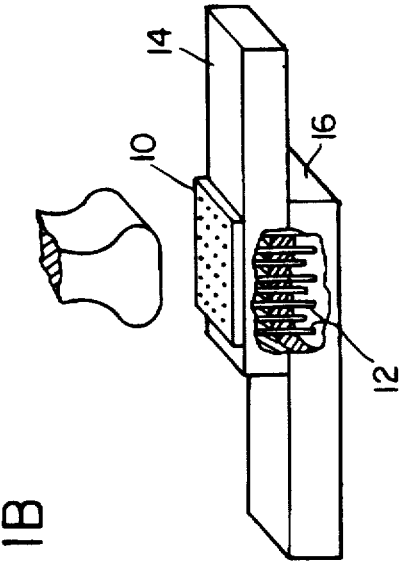

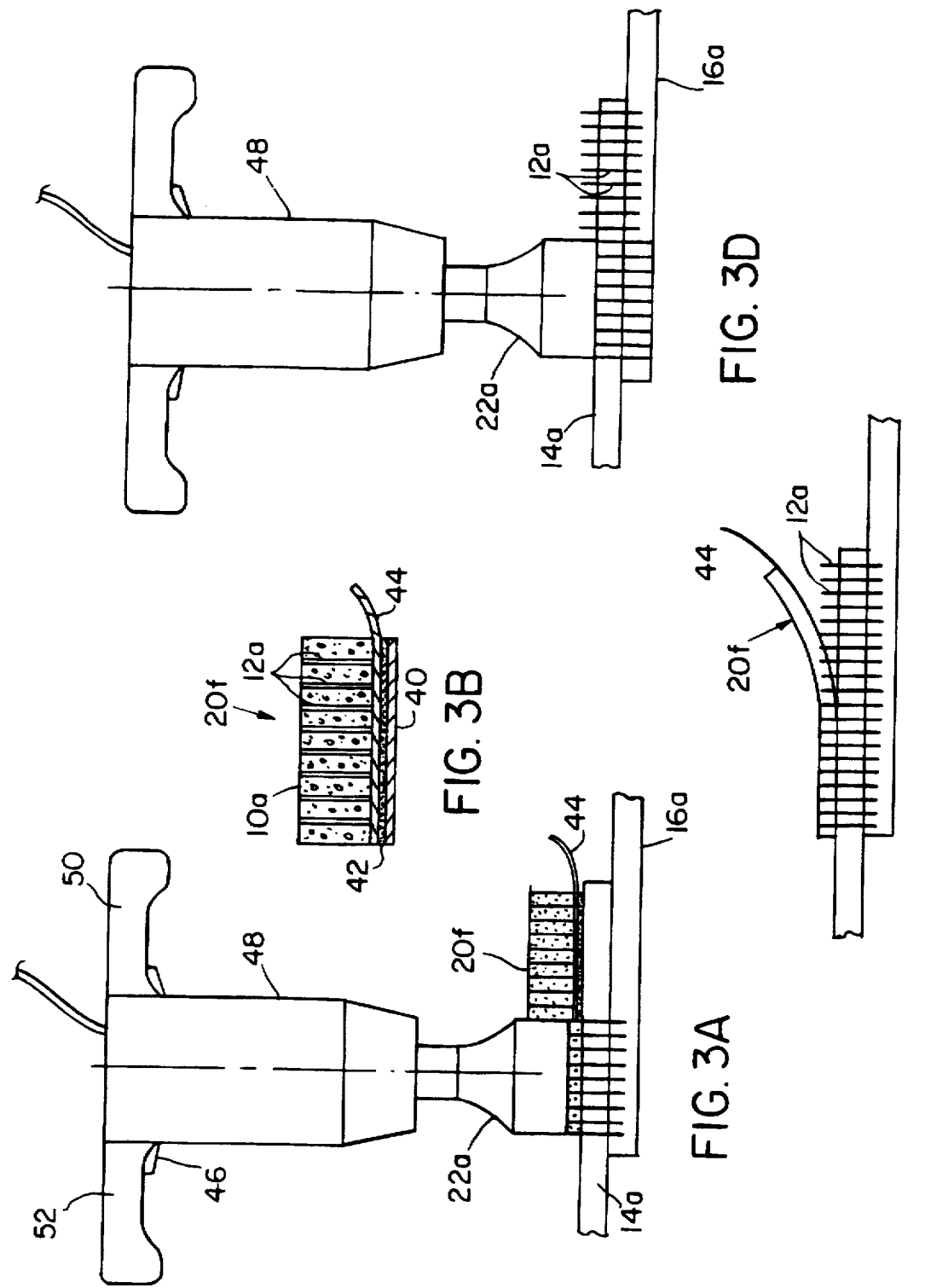

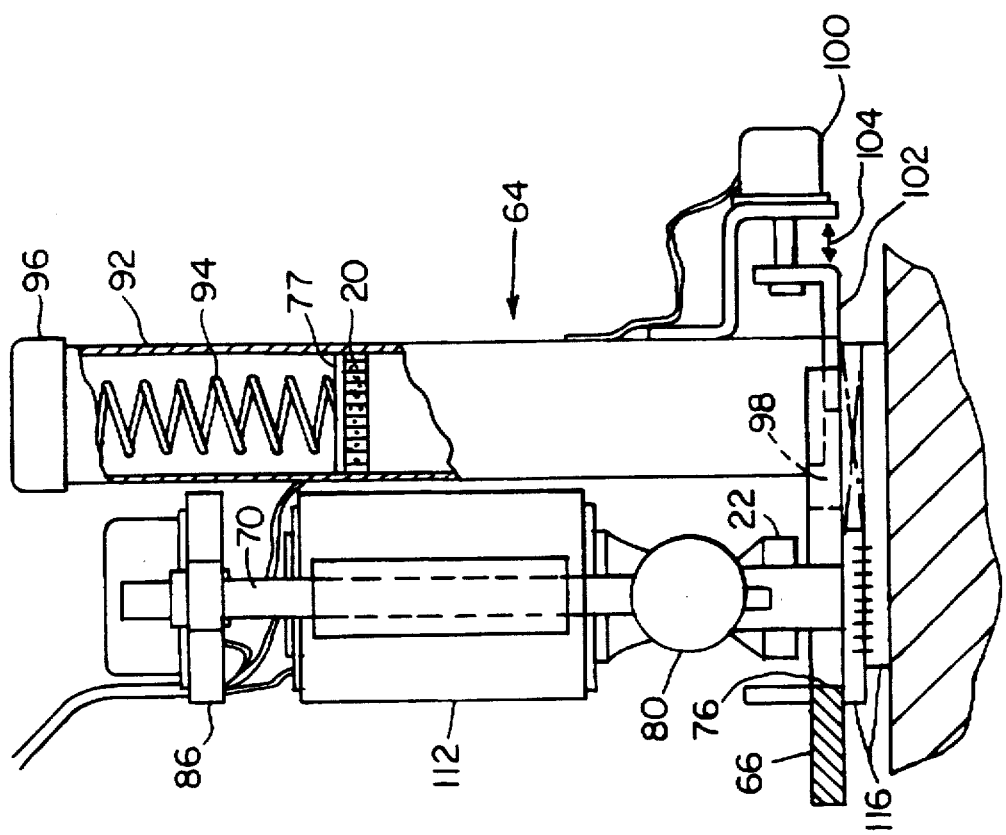
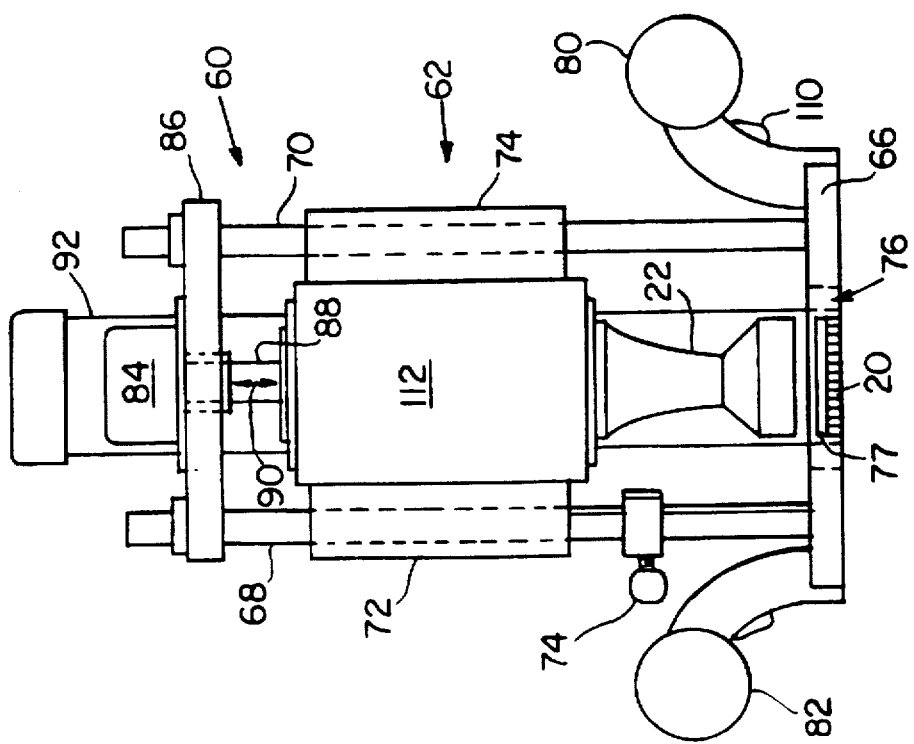
FIG. 5
FIG. 4

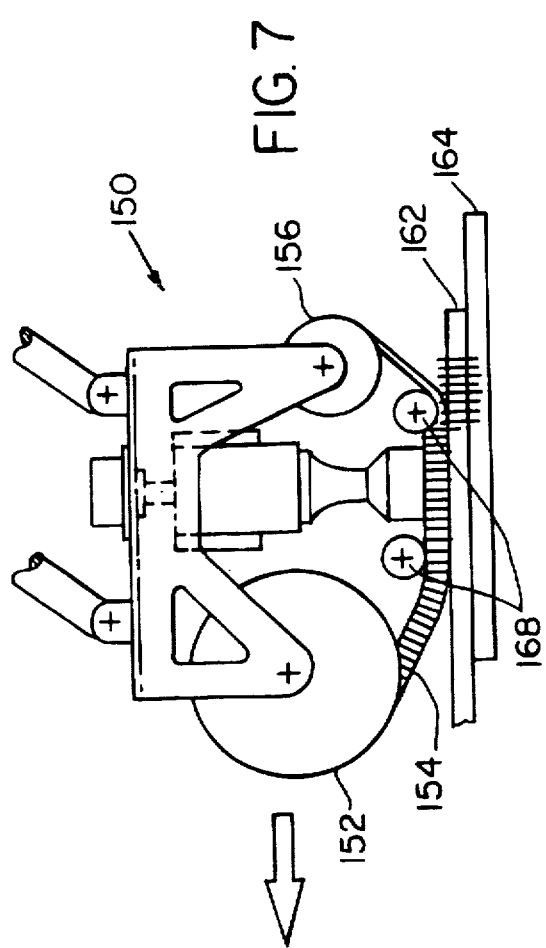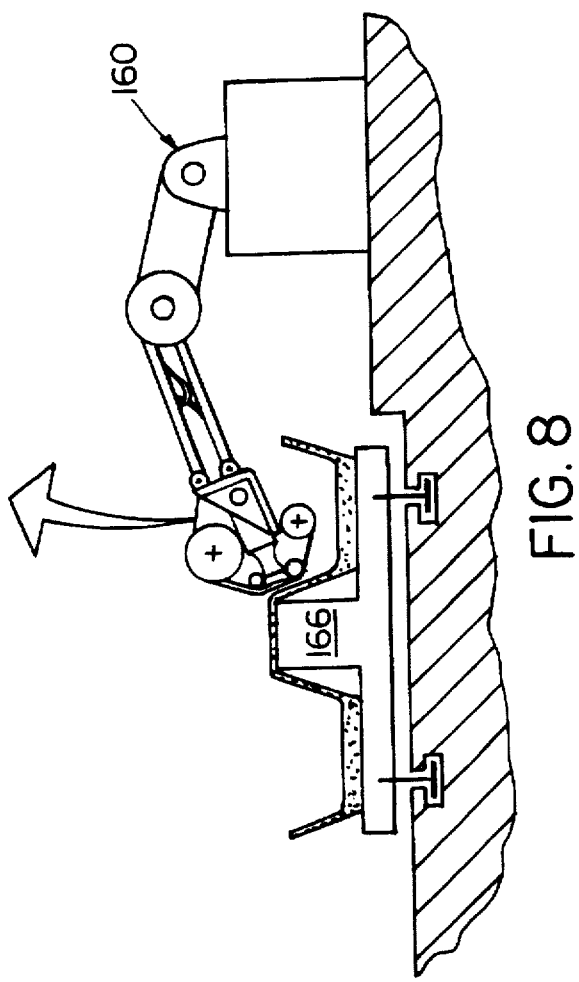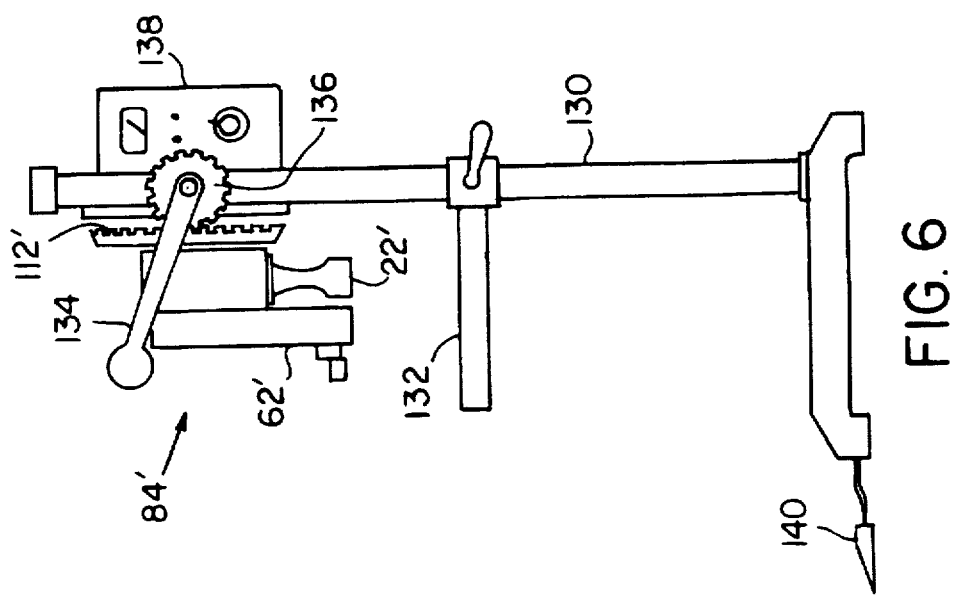

ULTRASONIC FASTENING SYSTEM AND METHOD

This application is a continuation-in-part application of U.S. patent application Ser. No. 08/600,473 filed Feb. 13, 1996, now U.S. Pat. No. 5,589,015 which is a continuation of U.S. patent application Ser. No. 08/254,987 filed Jun. 7, 1994 abandoned.

FIELD OF INVENTION

This invention relates to an ultrasonic fastening method for joining two plastic parts or one plastic part and another part and an ultrasonic fastening system for reinforcing a single composite part, or for joining a wide variety of parts.

BACKGROUND OF INVENTION

Joining two or more plastic parts together is usually accomplished with screws or other fasteners. The joining process is slow and cumbersome often resulting in expensive manual labor.

Balamuth, in U.S. Pat. No. 03,184,353, discloses an ultrasonic horn apparatus which inserts one screw at a time through two plastic members. An ultrasonic horn is adapted with a screw socket and placed in a press. This apparatus, however, requires the operator to manually place one screw at a time in the socket of the ultrasonic horn and then manually lower the press after the ultrasonic horn is energized.

Accordingly, this device is limited to screw type fasteners and is not useful in the field since it is not portable. This device also suffers from the limitation that only one screw can be inserted at a time.

Boyce, U.S. Pat. No. 05,186,776 discloses a hollow ultrasonic horn needle tip which penetrates a composite laminate and deposits a reinforcing fiber within the laminate. Again, this device is not portable, only one reinforcing fiber is inserted at a time, and in use, the needle was prone to clogging.

Boyce, U.S. Pat. No. 04,808,461, shows a method of inserting a plurality of reinforcing fibers through two composite components using an autoclave. In many situations, however, the use of an autoclave is expensive and time consuming.

Accordingly, no art discloses a device which has the capability to simultaneously insert a plurality of fasteners such as pins or screws to join two plastic parts or one plastic part and a composite part or two composite parts in an efficient and inexpensive manner especially in situations when a press or autoclave is not available, i.e., in the field.

SUMMARY OF INVENTION

It is therefore an object of this invention to provide an improved ultrasonic fastening method.

It is a further object of this invention to provide an improved ultrasonic fastening system.

It is a further object of this invention to provide such an improved ultrasonic fastening method and system which is portable and thus can be used in the field.

It is a further object of this invention to provide such an ultrasonic fastening method and system which has the capability of inserting a number of reinforcing elements at the same time.

It is a further object of this invention to provide such an improved ultrasonic fastening method and system which is extremely efficient and which results in a automated reinforcing and joining apparatus.

It is a further object of this invention to provide such an ultrasonic fastening method and system which eliminates much of the manual labor associated with the prior to art.

This invention results from the realization that two plastic parts or components can be quickly, efficiently, and reliably joined in the field by placing a number of fasteners such as pins or screws in a foam body which maintains the orientation of the pins or screws during insertion; placing the fasteners/foam body combination on the two parts to be joined; and energizing the fasteners with ultrasonic energy and applying pressure to simultaneously drive the fasteners through both parts. The ultrasonic horn heats the fasteners so that they are easily driven into plastic parts and the heated fasteners also cause localized melting of the plastic parts thus fusing the two parts together to ensure a strong and reliable joint.

This invention results from the further realization that the manual labor associated with current composite part reinforcing and joining techniques for composite and plastic parts can be reduced by using an ultrasonic fastening system which automatically feeds the combined fastener/compressive members beneath the ultrasonic horn which is then lowered to push the fasteners into the part or parts.

This invention features a ultrasonic fastening method for joining one plastic component into another plastic component, a piece of fabric, or a non-plastic component. The plastic member is oriented with respect to a second member to be joined to the plastic member at a joint region therebetween. A plurality of fasteners are inserted into a compressible member to form a fastener/compressible member combination to support and maintain the proper orientation of the fasteners during insertion. The fasteners may be straight pins, screws, pins with flat heads, or any other kind of fastener. The fastener compressible member combination is placed proximate the joint region between the plastic member and the second member and then ultrasonic energy is imparted to the fasteners while they are simultaneously driven into the plastic member and into the second member.

In one embodiment, the method further includes attaching a metal plate to the fasteners. Any residual compressible material may be removed after the fasteners are driven into the plastic member or alternatively, the residual compressible material may be left on the plastic member. This invention also features the product manufactured by the process described above.

This invention also features an ultrasonic fastening system. There is a ultrasonic transducer subsystem including an ultrasonic horn and means for lowering and raising the ultrasonic horn. There is also a fastener/compressible material feed subsystem including means for feeding a combined fastener/compressible member beneath the ultrasonic horn. Such a system may be used for reinforcing the individual plies of a single composite part either in the cured, prepreg, preform stage, or may be used to join two composite members, two plastic members, or any combination thereof.

The means for lowering and raising may include a base member with an orifice for receiving the ultrasonic horn and at least one guide member upstanding from the base member. There are means for slidably mounting said ultrasonic horn on the guide member. In an automatic system, there is an actuator for automatically lowering and raising the ultrasonic horn. The means for feeding typically includes a base member and a hollow feed member upstanding from the base member containing a stack of the combined fastener/ compressible members. There is also some means for urging the combined fastener/compressible members toward the base member such as a spring within the hollow member. The base member preferably includes a channel in communication with the hollow feed member for transferring the combined fastener/compressible members from the hollow feed member to a position proximate the ultrasonic horn. In an automatic system, there is a linear actuator slidable with respect to the channel for automatically transferring individual combined fastener/compressible members from a position proximate the hollow feed member to a position proximate the ultrasonic horn.

In another embodiment, the means for feeding includes a roll of tape of the combined fastener/compressible members fed beneath the ultrasonic horn and taken up by a take-up stool.

In still another embodiment, there is a linearly actuated frame including a supply of the combined fastener/compressible members. Another frame includes a plurality of ultrasonic horns corresponding to the number of feed devices.

DISCLOSURE OF PREFERRED EMBODIMENT

Other objects, features and advantages will occur to those skilled in the art from the following description of a preferred embodiment and the accompanying drawings, in which:

FIGS. 1A–1E schematically depicts the ultrasonic fastening method of this invention for joining two plastic parts;

FIG. 2 is a schematic view showing the ultrasonic fastening method of this invention when reinforcing elements are to be inserted at more than one location;

FIGS. 3A–3D are schematic views showing one type of an ultrasonic fastening system in accordance with this invention;

FIG. 4 is a front schematic view of another embodiment of the ultrasonic fastening system of this invention;

FIG. 5 is a side view of the ultrasonic fastening system of FIG. 4;

FIG. 6 is a side view of another ultrasonic fastening system in accordance with the subject invention;

FIG. 7 is a schematic view of another embodiment of the ultrasonic fastening system of this invention;

FIG. 8 is a schematic view of the ultrasonic fastening system shown in FIG. 7 in use.

Figure 9A:
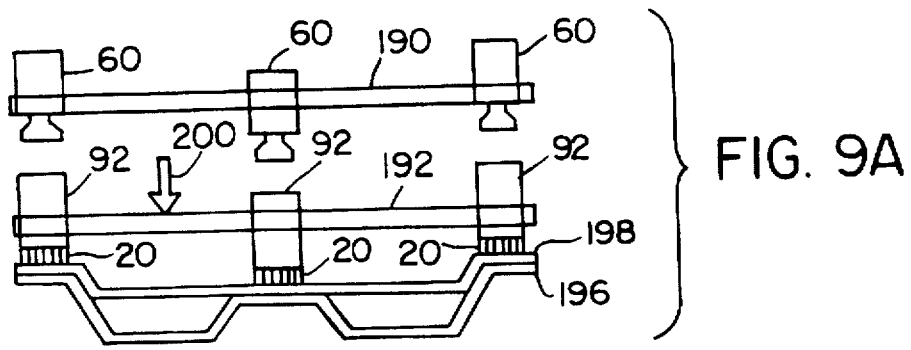
FIGS. 9A–9D are schematic views showing another embodiment of the ultrasonic fastening system of this invention.

FIGS. 1A–1E depict the primary steps in the ultrasonic fastening method of this invention as it relates to plastic components. Compressible member 10, FIG. 1A, is made of foam or some other suitable material such as RTV silicon rubber, FIBERFORM™ graphite insulation, KAWOOL™ ceramic insulation, phenolic based foam, fiberglass, polyamide base insulation, maleimide, ROHACELLTN™, PVC (polyvinylchloride), polyethylenes, polyesters, polyurethanes, polystyrenes, PEEK, PBS, or any other substance compressible under pressure.

Fasteners 12, FIGS. 1A, 1B, and 1C are positioned within compressible body 12 as shown and supported by compressible member 10 during the insertion process, to Fasteners 12 may be screws such as screw 13, FIG. 1A or pins made of aluminum, boron, carbon, glass, tungsten, rigid phenolics, rigid polyimides, ceramics, and composites of such materials. The diameter, length, and spacing of the fasteners will depend on the geometry of the parts to be joined. Another type of fastener is pin 15 with shaft 17 and head 19. The fasteners may be disposed vertically within foam body 10 or at any angle desired. Fasteners 12 are inserted within compressible member 10 manually or by using a numerical control subsystem (not shown).

Two such parts to be joined are shown as part 14, FIG. 1A and part 16 which may be any kind of thermoplastic, thermosetting plastic, or any other plastic material. Alternatively, member 14 may be a plastic material and member 16 may be a composite material including plies of resin reinforced fabric or fiber. Also, member 14 could be a layer of fabric to be attached to plastic member 16 as a covering, or member 16 could be plastic and member 14 could be wood or any other material which is capable of receiving fasteners 12.

The overlap of part 14 and part 16 as shown at 18 is referred to the "joint region" between parts 14 and 16 and the fastener/compressible member combination hereinafter referred to as member 20 is placed proximate joint region 18.

Once fastener/compressible member 20 is placed proximate joint region 18, ultrasonic horn 22 is energized and brought to bear down upon fastener/compressible member 20 as show in FIG. 1A. This action simultaneously drives all of the fasteners through part 14 and into part 16 thus joining the two parts as shown in FIG. 1C. The residue of compressible member 10 is then removed, as shown in FIG. 1D, and any fasteners which extend upward from the top surface of member 14 are filed flush or inserted further using ultrasonic horn 22.

In cross-section, the result is as shown in FIG. 1E wherein fasteners 12 are shown disposed through both parts 14 and 16. When ultrasonic horn 22 is energized, ultrasonic energy is transferred to the fasteners thus heating the fasteners and facilitating their insertion into members 14 and 16. In practice, it was noted that the heated fasteners caused localized melting at the joint interface between members 14 and 16 as shown at 24, FIG. 1E. When this melted plastic material solidifies, it helps to ensure a strong joint between members 14 and 16.

Two larger plastic components 30 and 32 can be joined by using a plurality of fastener/composite members 20a, 20b, 20c, 20d, and 20e as shown in FIG. 2, and sequentially bringing ultrasonic horn 22 down to stamp the fasteners present in each fastener/compressible member combination through part 30 and into part 32. Accordingly, the ultrasonic fastening method of this invention is suitable for automated robotics or numerical control manufacturing processes.

In the hand held version of the ultrasonic fastening system of this invention, fastener/composite member combination 20f, FIGS. 3A and 3B, include a plurality of reinforcing elements 12a in foam body 10a and there is also a protective cover 40, adhesive ply 42 and release ply 44. Protective cover ply 40 is removed and body 10a is placed on parts 14A and 16A to be joined which may be plastic parts, composite parts, (either cured or in the prepreg or preform stage), or wood or even metallic or alloy parts or any combination thereof. Hand held ultrasonic transducer 48 is then energized by the operator who depresses switch 46 and applies downward pressure to ultrasonic horn 22a via handles 50 and 52.

As shown in FIG. 3A, transducer 48 is first used to insert the fasteners of the left hand section of fastener/compressible member 20f and then moved over to the right hand section to insert the fasteners of that section through part 14a and into part 16a. The residual from the compressed material of fastener/compressible body 20f is then peeled away, FIG. 3C by pulling on the end of release ply 44. Alternatively, the residual portion of fastener/compressible member 20f may be left in place to provide additional anchorage for fasteners 12a. In an optional step, fasteners 12a are set flush with the surface of part 14a by applying downward pressure to transducer 48, FIG. 3D and again applying ultrasonic energy to the projecting end of fasteners 12a via ultrasonic horn 22a.

As delineated above, the subject invention also features an ultrasonic fastening system wherein the fastener/compressible material is automatically fed to the ultrasonic horn. In one embodiment, ultrasonic fastener system 60, FIG. 4 includes ultrasonic horn subsystem 22 and means 62 for lowering and raising ultrasonic horn 22. Fastener/compressible member 20 further includes an optional metallic plate layer 77. The fasteners are attached via welding or soldering techniques to metallic plate 77 before they are inserted into the foam. Metallic layer 77 assists in transmitting ultrasonic energy to the fasteners, aids in maintaining the alignment of the fasteners during insertion, and forms an integral part of the fastening medium between two parts. There is also a fastener/compressible material feed subsystem 64, FIG. 5 for feeding combined fastener/compressible members 20 beneath ultrasonic horn 22.

Ultrasonic horn 22 is raised and lowered proximate base portion 66 by the use of guide members 68 and 70 extending upward from base 66 as shown. Ultrasonic horn 22 and its associated transducer are slidably mounted via members 72 and 74 on guide members 68 and 70, respectively. Stop 74 limits the travel motion of member 72 so that ultrasonic horn 22 is properly received within orifice 76 of base 66. Handles 80 and 82 are grasped by the operator to position device 60 as required.

Actuator 84 is mounted to top bracket 86 and moves shaft 88 in the direction shown by arrow 90 to automatically raise and lower ultrasonic horn 22. A supply of combined fastener/compressible members reside within feedtube 92 also shown in FIG. 5. Spring 94 is compressed between cap 96 and the upper most member of the stack of combined fastener/compressible members as shown in FIG. 5 to urge the combined fastener/compressible members downward towards base 66 of device 60. Base 66 includes channel 98 in communication on one end thereof with guidetube 92 and in communication on the other end thereof with orifice 76 in base plate 66 through which ultrasonic horn 22 is received. Linear actuator 100 drives feed bar 102 in the direction shown by arrow 104 to push an individual fastener/compressible member within channel 98 to a position beneath ultrasonic horn 22.

The operator depresses switch 110, FIG. 4 to initiate the insertion sequence which proceeds as follows. When switch 110 is depressed, feed bar 104 is retracted to open the end of guidetube 92 causing the stack of combined fastener/compressible members 20 to index down. Feed bar 104 then moves forward pushing a single fastener/compressible member within channel 98 and into position under horn 22. Transducer 112 is then activated causing ultrasonic energy to be transmitted to horn 22. At the same time, actuator 84 is energized which moves horn 22 into contact with a combined fastener/compressible member and applies pressure to compress the same and insert the fasteners into part 116. The result is that the fasteners (in this example pins) to reinforce the individual plies of a composite part and prevent delamination. Alternatively, system 60 may be used to join two composite parts, two plastic parts, a plastic part and a composite part, or any combination of different types of materials.

In another embodiment, device 60, FIG. 4, without actuator 84 is shown as device 84' may be mounted on stand 130, FIG. 6. Stand 130 includes adjustable work surface 132 and lever 134 connected to rack and pinion gear 136 for raising and lowering device 84'. Ultrasonic horn 22' and transducer 112' are powered by power supply 138 triggered by foot pedal 140.

In another embodiment, device 150, FIG. 7 includes a roll 152 of tape including the combined fastener/compressible members as shown being fed off roll 152 at 154. Take-up spool 156 receives the compacted material after the pins are driven into the parts. Robot 160, FIG. 8, positions device 150 relative to parts 162 and 164 (or a single composite part already cured, or in the preform or "prepreg" stage to be reinforced by the individual fasteners in the form of pins) which are supported on conveyor 166. Guides 168 assist in maintaining tape 154 in the correct position.

Figure 9B:
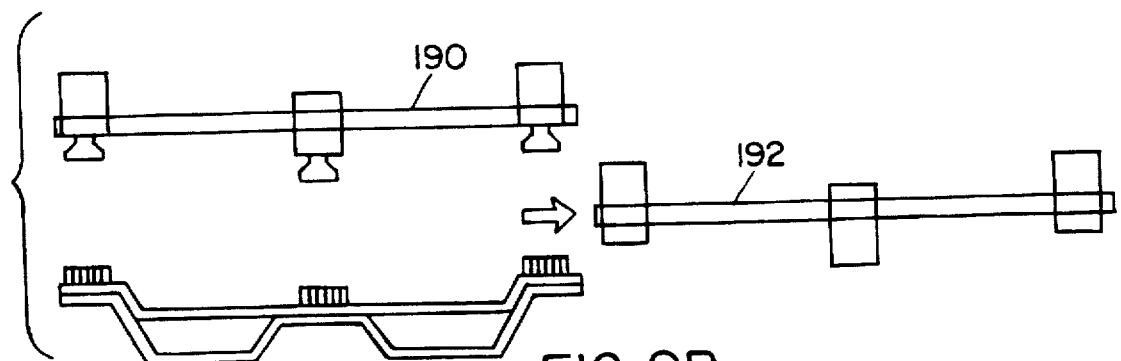
Figure 9C:
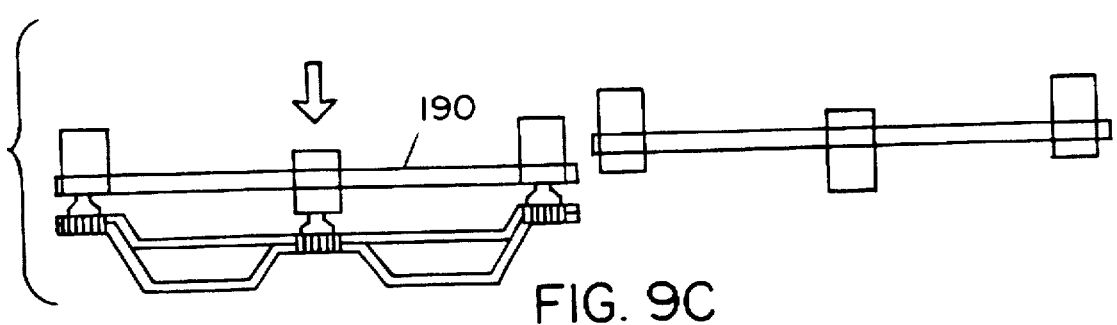
Figure 9D:
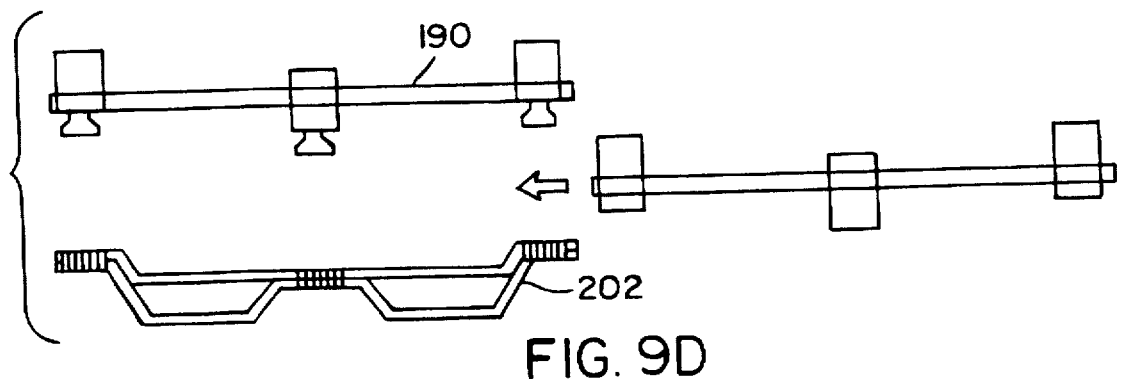

For a high rate production situations such as may be encountered in the automobile industry, for example, a dedicated piece of machinery designed specifically for the assembly of one particular component may be desirable. Accordingly, as shown in FIGS. 9A–9D, there is a first frame 190 including a plurality of insertion devices such as the insertion device embodiment shown as 60 in FIG. 4 and a second frame 192 including a complementary number of fastener/compressible member feeders similar to the guidetube subassembly 92 shown in FIG. 5. Frame 190 is connected to a mechanical, electrical, hydraulic and/or pneumatic device which raises and lowers frame 190 with respect to parts 196 and part 198 to be joined. Frame 192 is connected to a mechanical, electrical, hydraulic, and/or pneumatic device which permits frame 192 to be translated horizontally with respect to parts 196 and 198. In this case, part 196 is a composite stiffener member including plies of resin reinforced fibers and part 198 is a plastic part. Frame 192 is lowered into position over parts 196 and 198 as shown by arrow 200, FIG. 9A. Feed subsystems 92 are activated to deposit the fastener/compressible members 20 at the desired locations. Frame 192 is then raised and moved horizontally as shown in FIG. 9B. Frame 190 is then lowered into contact with the combined fastener/compressible members as shown and the individual ultrasonic horns are activated. Further lowering of frame 190 compresses the individual combined fastener/compressible members and inserts the pins or screws into parts 198 and 196 thus joining them. As shown in FIG. 9D, frame 190 is then raised and finish part 202 is removed and another series of parts is processed. The joining process discussed above is then repeated.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An ultrasonic fastening system comprising:
   an ultrasonic transducer subsystem including an ultrasonic horn, a power source, and means for lowering and raising said ultrasonic horn; and
   a fastener/compressible material feed subsystem including means for feeding a combined fastener/compressible member beneath said ultrasonic horn, each combined fastener/compressible member including a compressible body and a plurality of fasteners inserted into the compressible body such that the compressible body supports the fasteners.

2. The system of claim 1 in which said means for lowering and raising said ultrasonic horn includes a base member including an orifice for receiving said ultrasonic horn, at least one guide member upstanding from the base member, and means for slidably mounting said ultrasonic horn on said guide member.

3. The system of claim 2 in which said means for lowering and raising further includes an actuator for automatically lowering and raising said ultrasonic horn.

4. The system of claim 1 in which said means for feeding includes a base member and a hollow feed member upstanding from said base member and containing a stack of said combined fastener/compressible members.

5. The system of claim 4 in which said hollow member includes means for urging the combined fastener/compressible members toward said base member.

6. The system of claim 5 in which said means for urging includes a spring, one end of which is placed against a closed upper end of the hollow member, and one end of which is placed against the upper most member of the stack of combined faster/compressible members.

7. The system of claim 4 in which said base includes a channel therein in communication with said hollow feed member for transferring said combined fastener/compressible members from said hollow feed member to a position proximate said ultrasonic horn.

8. The system of claim 7 in which said means for feeding further includes a linear actuator slidable with respect to said channel for automatically transferring said combined fastener/compressible members from a position proximate the hollow feed member to a position proximate the ultrasonic horn.

9. The system of claim 1 in which said means for feeding includes a roll of tape including said combined fastener/compressible members to be fed beneath said ultrasonic horn.

10. The system of claim 9 in which said means for feeding further includes a take-up spool for receiving tape fed off said roll.

11. The system of claim 1 in which said means for feeding includes a linearly actuatable frame including a supply of said combined fastener/compressible members.

12. The system of claim 11 in which said frame includes a plurality of feed devices.

13. The system of claim 12 in which said ultrasonic horn subsystem includes a frame having a plurality of ultrasonic horns corresponding to the number of feed devices.

14. An ultrasonic fastening system comprising:
an ultrasonic transducer subsystem including an ultrasonic horn, a power supply; and
a supply of combined fastener/compressible members, each including a compressible body and a plurality of fasteners inserted into said compressible body such that the compressible body supports said fasteners.

15. The system of claim 14 further including means for feeding said supply, said means for feeding including a base member and a hollow feed member upstanding from said base member and containing a stack of said combined fastener/compressible members.

16. The system of claim 15 in which said hollow member includes means for urging the combined fastener/compressible members toward said base member.

17. The system of claim 16 in which said means for urging includes a spring, one end of which is placed against a closed upper end of the hollow member, and one end of which is placed against the upper most member of the stack of combined faster/compressible members.

18. The system of claim 15 in which said base includes a channel therein in communication with said hollow feed member for transferring said combined fastener/compressible members from said hollow feed member to a position proximate said ultrasonic horn.

19. The system of claim 18 in which said means for feeding further includes a linear actuator slidable with respect to said channel for automatically transferring said combined fastener/compressible members from a position proximate the hollow feed member to a position proximate the ultrasonic horn.

20. The system of claim 14 in which said supply includes a roll of tape including said combined fastener/compressible members fed beneath said ultrasonic horn.

21. The system of claim 20 further including a take-up spool for receiving tape fed off said roll.

22. An ultrasonic fastening system comprising:
an ultrasonic transducer subsystem including an ultrasonic horn;
a fastener/compressible material feed subsystem including means for feeding a combined fastener/compressible member beneath said ultrasonic horn, each fastener/compressible member including a compressible body and a plurality of fasteners inserted in the compressible body such that the compressible body supports the fasteners;
a base member including an orifice for receiving said ultrasonic horn;
at least one guide member upstanding from the base member;
means for slidably mounting said ultrasonic horn on said guide member;
a hollow feed member upstanding from said base member and containing a stack of said combined fastener/compressible members; and
means for urging the combined fastener/compressible members toward said base member.

23. An ultrasonic fastening system comprising:
an ultrasonic transducer subsystem including an ultrasonic horn and means for lowering and raising said ultrasonic horn;
a roll of tape including combined fastener/compressible members fed beneath said ultrasonic horn, each fastener/compressible member including a compressible body and a plurality of fasteners inserted into the compressible body such that the compressible body supports the fasteners; and
means for feeding the tape beneath said ultrasonic horn.

24. An ultrasonic fastening system comprising:
a first frame including a plurality of ultrasonic transducer subsystems each including an ultrasonic horn;
means for lowering and raising said frame; and
a second frame including a plurality of fastener/compressible material feed subsystems each including means for feeding a combined fastener/compressible member beneath each said ultrasonic horn, each fastener/compressible member including a compressible body and a plurality of fasteners inserted into the compressible body such that the compressible body supports the fasteners.

25. An ultrasonic fastening system comprising:
an ultrasonic transducer subsystem including an ultrasonic horn and a power supply;
a supply of combined fastener/compressible member each member including a compressible body and a plurality of fasteners inserted in said compressible body such that the compressible body supports said fasteners; and means for feeding said supply, said means for feeding including a base member and a hollow feed member upstanding from said base member and containing a stack of said combined fastener/compressible members.

26. An ultrasonic fastening system comprising:

an ultrasonic transducer subsystem including an ultrasonic horn, a power source, and means for lowering and raising said ultrasonic horn; and a fastener/compressible material feed subsystem including:

means for feeding a combined fastener/compressible member beneath said ultrasonic horn;

a base member; and a hollow feed member upstanding from said base member and containing a stack of said combined fastener/compressible members, each fastener/compressible member including a compressible body and a plurality of fasteners inserted into said compressible body such that the compressible body supports said fasteners.

27. An ultrasonic fastening system comprising:

an ultrasonic transducer subsystem including an ultrasonic horn, a power source, and means for lowering and raising said ultrasonic horn; and a fastener/compressible material feed subsystem including, means for feeding a combined fastener/compressible member beneath said ultrasonic horn and, a roll of tape including said combined fastener/compressible members to be fed beneath said ultrasonic horn, each fastener/compressible member including a compressible body and a plurality of fasteners inserted in the compressible body such that the compressible body supports the fasteners.

28. An ultrasonic fastening system comprising:

an ultrasonic transducer subsystem including an ultrasonic horn, a power source, and means for lowering and raising said ultrasonic horn; and a fastener/compressible material feed subsystem including means for feeding a combined fastener/compressible member beneath said ultrasonic horn; and a linearly actuatable frame including a supply of said combined fastener/compressible members, each fastener/compressible including a compressible body and a plurality of fasteners inserted into the compressible body such that the compressible body supports the fasteners.

29. An ultrasonic fastening system comprising:

an ultrasonic transducer subsystem including an ultrasonic horn;

a power supply;

a supply of combined fastener/compressible members each member including a compressible body and a plurality of fasteners inserted in said compressible body such that the compressible body supports said fasteners, said supply including a roll of tape including said combined fastener/compressible members fed beneath said ultrasonic horn; and a take up spool for receiving tape fed off said roll.

* * * * *